(12) United States Patent
Shirone

(10) Patent No.: US 9,919,393 B2
(45) Date of Patent: Mar. 20, 2018

(54) ROTARY WORKHEAD DEVICE

(75) Inventor: Masahiro Shirone, Fujikawaguchiko-machi (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 61 days.

(21) Appl. No.: 14/233,107

(22) PCT Filed: Jul. 15, 2011

(86) PCT No.: PCT/JP2011/066772
§ 371 (c)(1),
(2), (4) Date: Jan. 15, 2014

(87) PCT Pub. No.: WO2013/011593
PCT Pub. Date: Jan. 24, 2013

(65) Prior Publication Data
US 2014/0157962 A1    Jun. 12, 2014

(51) Int. Cl.
*B23C 1/14* (2006.01)
*B23Q 1/26* (2006.01)
(Continued)

(52) U.S. Cl.
CPC ............... *B23Q 1/26* (2013.01); *B23Q 1/52* (2013.01); *B23Q 3/063* (2013.01); *B23Q 3/066* (2013.01);
(Continued)

(58) Field of Classification Search
CPC .... B23C 1/14; B23C 3/02; B23C 3/04; B23C 3/18; B23C 2215/44; B23C 3/15;
(Continued)

(56) References Cited

U.S. PATENT DOCUMENTS 341,437 A * 5/1886 Ernst ..................... B23B 31/261
2,308,531 A * 1/1943 Mathewson .................. 451/223
(Continued)

FOREIGN PATENT DOCUMENTS

DE   102004036371    2/2006
EP       0547554     6/1993
(Continued)

OTHER PUBLICATIONS

International Search Report dated Oct. 11, 2011, directed to International Application No. PCT/JP2011/066772; 2 pages.
(Continued)

*Primary Examiner* — Alan Snyder
(74) *Attorney, Agent, or Firm* — Morrison & Foerster LLP

(57) ABSTRACT

The rotary workhead device, which is loaded on the table of a machine tool and onto which a workpiece to be machined is rotatably mounted, is equipped with: a base plate that is attached to the table of the machine tool; two rotary workheads that are provided on the base plate and disposed so that the axes of rotation coincide and the workpiece-fixing parts face each other; a guide means that is provided so as to be capable of moving at least one of the rotary workheads back and forth in the direction of the rotation axes; and an impelling means for impelling the one rotary workhead in a direction that separates or brings together the two rotary workheads. The rotary workhead device applies a tensile force or a compressive force on a workpiece, the respective ends of which are fixed between the two rotary workheads.

3 Claims, 3 Drawing Sheets

(51) Int. Cl.
*B23Q 3/06* (2006.01)
*B23Q 11/00* (2006.01)
*B23Q 1/52* (2006.01)

(52) U.S. Cl.
CPC ............ *B23Q 11/0032* (2013.01); *B23C 1/14* (2013.01); *B23C 2215/44* (2013.01); *Y10T 29/5114* (2015.01); *Y10T 29/5196* (2015.01); *Y10T 82/2572* (2015.01); *Y10T 409/305824* (2015.01)

(58) Field of Classification Search
CPC ........ B23Q 1/262; B23Q 1/265; B23Q 3/063; Y10T 82/2524; Y10T 82/2564; Y10T 409/305656; Y10T 409/305712; Y10T 409/305756; Y10T 409/305768; Y10T 409/305824
See application file for complete search history.

(56) References Cited

U.S. PATENT DOCUMENTS

| | | | | |
|---|---|---|---|---|
| 2,420,296 | A * | 5/1947 | Bishop et al. | 451/222 |
| 4,048,881 | A * | 9/1977 | Disston, Jr. | 82/148 |
| 4,625,461 | A * | 12/1986 | Vetter | 451/11 |
| 4,751,864 | A * | 6/1988 | Leigh et al. | 82/148 |
| 4,831,782 | A * | 5/1989 | Clough et al. | 451/140 |
| 4,869,140 | A * | 9/1989 | Alexander | 82/150 |
| 4,951,422 | A * | 8/1990 | Ibe | G05B 19/402 |
| | | | | 451/398 |
| 5,282,402 | A * | 2/1994 | Cady et al. | 82/117 |
| 5,421,229 | A * | 6/1995 | Grossmann | B23Q 5/40 |
| | | | | 29/27 C |
| 5,634,250 | A * | 6/1997 | Mihailovic | 29/26 A |
| 5,964,016 | A * | 10/1999 | Ito et al. | 29/27 C |
| 6,202,520 | B1 * | 3/2001 | Cardemon | B23B 1/00 |
| | | | | 82/1.11 |
| 6,827,631 | B2 * | 12/2004 | Tomotaki | B24B 1/00 |
| | | | | 409/165 |
| 7,261,500 | B2 * | 8/2007 | Killer et al. | 409/132 |
| 7,367,756 | B2 * | 5/2008 | Sugata et al. | 408/1 R |
| 9,033,762 | B2 * | 5/2015 | Makiuchi | B24B 5/045 |
| | | | | 409/165 |
| 2004/0107556 | A1 * | 6/2004 | Yasuda | B23Q 7/1431 |
| | | | | 29/27 C |
| 2005/0223530 | A1 | 10/2005 | Ferrari | |
| 2011/0052341 | A1 * | 3/2011 | Horn | B23Q 7/1431 |
| | | | | 409/159 |

FOREIGN PATENT DOCUMENTS

| | | |
|---|---|---|
| EP | 1593455 | 11/2005 |
| EP | 2 221 141 | 8/2010 |
| JP | 57-15609 | 1/1982 |
| JP | 10-34466 | 2/1998 |
| JP | 10-76437 | 3/1998 |
| JP | 2004-114291 | 4/2004 |
| JP | 2005-262326 | 9/2005 |
| JP | 3162183 | 8/2010 |
| JP | 2011-11312 | 1/2011 |
| SU | 658530 | 5/1979 |
| SU | 1105282 | 7/1984 |

OTHER PUBLICATIONS

Extended Search Report dated Feb. 20, 2015, directed towards European Application No. 11869622.8, 4 pages.

* cited by examiner

ROTARY WORKHEAD DEVICE

REFERENCE TO RELATED APPLICATION

This application is the national stage application under 35 USC 371 of International Application No. PCT/JP2011/066772, filed Jul. 15, 2011, the entire contents of which are incorporated herein by reference.

FIELD OF THE INVENTION

The invention relates to a rotary workhead for machine tools which process workpieces with tensile or compressive force applied on the workpieces.

BACKGROUND OF THE INVENTION

Conventionally, in order to produce curved surfaces on workpieces, machine tools having a plurality of feed axes are used. When a thin and fragile workpiece, such as turbine blades for steam or gas turbines is processed, it is necessary to prevent deformation of the workpiece due to machining force and vibrations generated from the contact between the tool and the workpiece.

Patent Document 1 describes a method and an apparatus for machining turbine blades. In the invention of Patent Document 1, one end of a workpiece is secured to a fixture and the other end is supported by a center piece of a tail stock. A tension member of the tailstock is engaged with a stepped part of the end of a turbine blade, and axially moved by a hydraulic cylinder, which is provided in the tail stock, in order to apply a tensile force to the turbine blade whereby the turbine blade is processed under the condition that the apparent rigidity of the turbine blade is increased.

In a machine tool for a turbine blade disclosed in Patent Document 2, one end of a turbine blade is secured by a main chuck, and the other end is held by a pressure chuck provided in a sub-chuck head. Compressive force is applied to the turbine blade by pressing the end of the turbine blade with the pressure chuck whereby the turbine blade is processed under the condition that the apparent rigidity of the turbine blade is increased.

Patent Document 1: Japanese Unexamined Patent Publication No. S57-15609

Patent Document 2: Japanese Unexamined Patent Publication No. H10-76437

SUMMARY OF THE INVENTION

In the invention of Patent Document 1, the hydraulic cylinder for axially moving the tension member is provided in the tailstock, resulting in complex configuration. In addition, a special tail stock, incorporated with a hydraulic cylinder, must be produced, resulting in remarkably increased cost.

Further, similar to the invention of Patent Document 1, in the invention of Patent Document 2, a pressing mechanism is incorporated in the sub-chuck head, resulting in complex configuration and increase in the production cost.

The invention is directed to solve the problems in the prior art, and the objective of the invention is to provide a rotary workhead device for a machine tool, which processes a workpiece under tensile or compressive force applied, improved to have a simple configuration whereby the production cost is reduced.

According to the invention, there is provided a rotary workhead device, disposed on a table of a machine tool, for rotatably mounting a workpiece to be processed, including a base plate adapted to be secured to the table of the machine tool, two opposing rotary workheads disposed on the base plate so as to align the respective rotational axes with each other, guide means for allowing at least one of the rotary workheads to reciprocally move in the direction of the rotational axes; and biasing means for biasing one of the rotary workheads in the direction away from or toward the other of the rotary workheads, wherein a tensile or compressive force is applied to the workpiece secured at its ends between the two rotary workheads.

According to this feature, a workpiece can be processed while tensile or compressive force is applied to the workpiece whereby the rigidity of the workpiece is apparently increased. Therefore, even a thin and low rigidity workpiece, such as a turbine blade, can be successfully processed because the bending is very small and vibrations are not generated.

It is not necessary to form a hydraulic cylinder in a tailstock, as described in patent document 1, because the means for biasing one of the two rotary workheads in the direction away from or toward the other rotary workhead can be disposed outside of the movable rotary workheads. This avoids the necessity of a hydraulic cylinder formed in a narrow space of the tailstock whereby the configuration is simplified and the cost can be reduced.

Further, commercial products can be used as the rotary workheads, which remarkably reduces production cost. This is further advantageous for users, because a special operation is not required. Further, when a problem occurs, it can be quickly fixed by replacing the broken rotary workhead with a commercial product, and therefore the downtime of the machine tool can be reduced.

According to the invention, the biasing means includes a fluid pressure operated cylinder provided between one of the rotary workheads and the base plate, and a pressure control device for varying the fluid pressure supplied to the fluid pressure operated cylinder.

According to this feature, suitable tensile or compressive force can be applied depending on the dimension and material of the workpiece by varying the fluid pressure supplied to the fluid pressure operated cylinder with the pressure control device.

Further, according to the invention, the guide means includes a lever device for allowing manual operation of the reciprocal movement of one of the rotary workheads when a biasing force of the biasing means is not applied.

In the invention, when a workpiece is mounted to the rotary workhead device, it is necessary to reciprocally move the rotary workhead along the guide means depending on the length of the workpiece or the shapes of the fixtures. According to the feature, this operation can be carried out with the lever device, when the biasing means does not apply the biasing force to one of the rotary workheads.

According to the invention, the guide means includes a brake device for clamping the reciprocal movement of one of the rotary workheads.

According to this feature, the brake device clamps the reciprocal movement of one of the rotary workheads, after a biasing force is applied to a rotary workhead. The biasing force is kept applied to the one of the rotary workheads if the biasing means is deactivated.

DETAILED DESCRIPTION OF THE INVENTION

Figure 1:
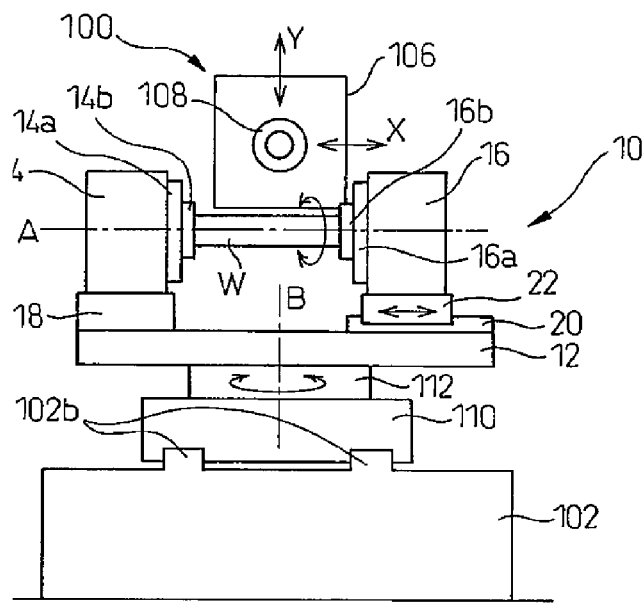
FIG. 1 is a front view of a machine tool with a rotary workhead device according to an embodiment of the invention.
Figure 2:
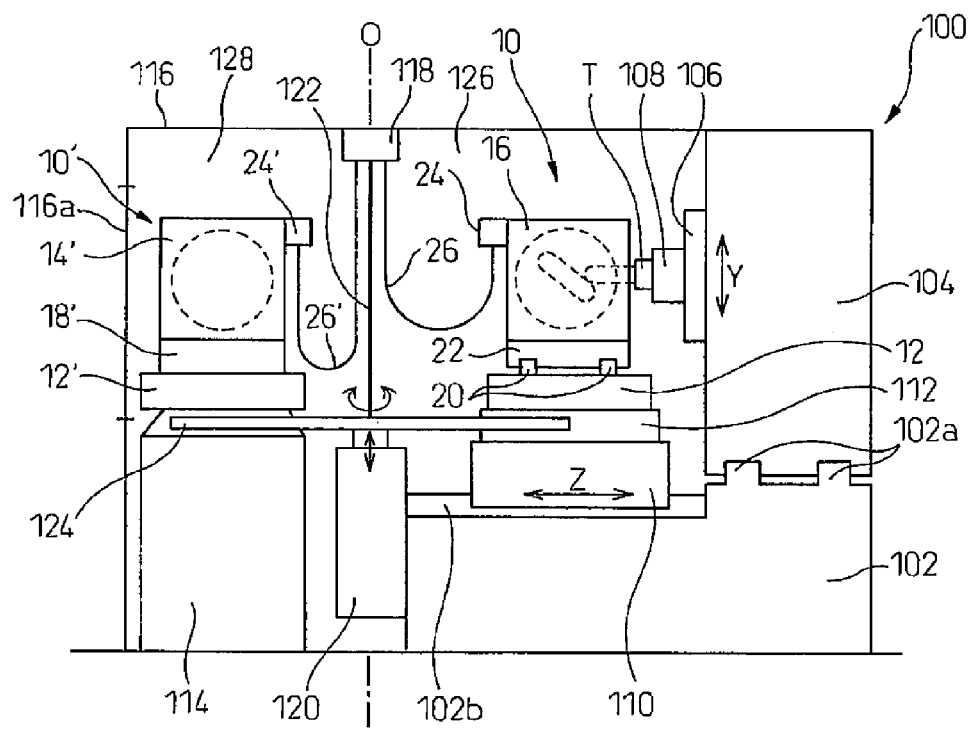
FIG. 2 is a side view of the machine tool of FIG. 1.
Figure 3:
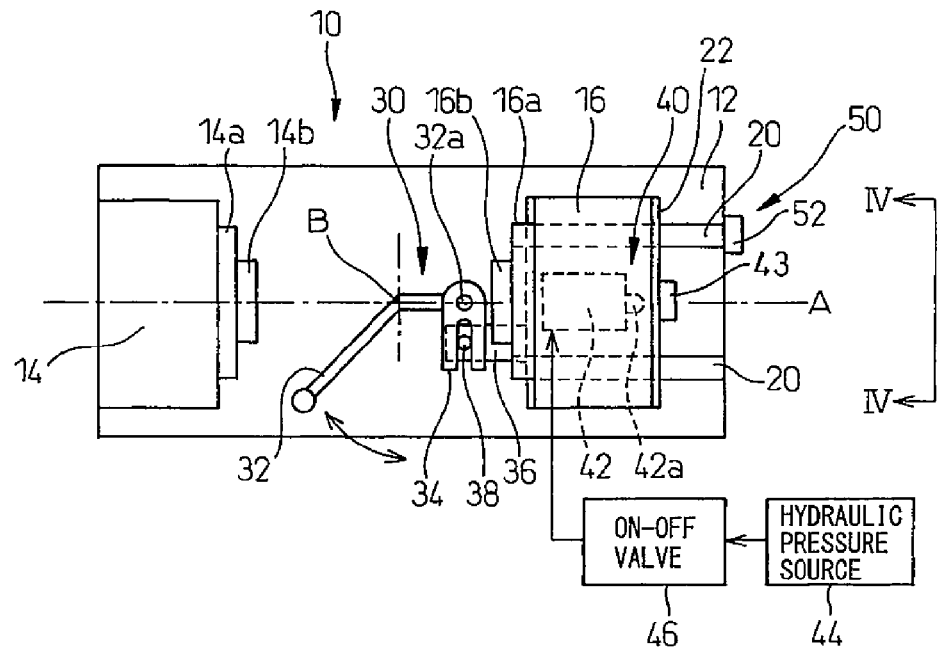
FIG. 3 is a plan view of the rotary workhead device.
Figure 4:
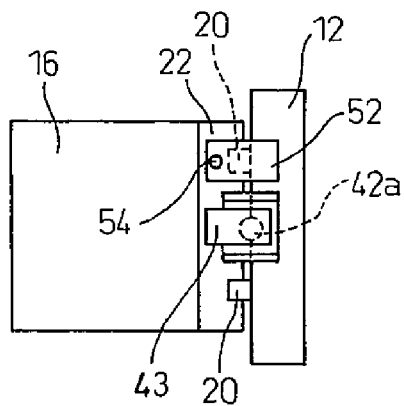
FIG. 4 is an end view of the rotary workhead device in the direction of arrow lines IV-IV in FIG. 3.

With reference to FIGS. 1-4, an embodiment of the rotary workhead device according to the present invention will be described below. FIG. 1 is a front view of a machine tool with a rotary workhead device according to an embodiment of the invention, FIG. 2 is a side view of the machine tool of FIG. 1, FIG. 3 is a plan view of the rotary workhead device and FIG. 4 is an end view of the rotary workhead device in the direction of arrow lines IV-IV in FIG. 3.

With reference to FIG. 1, a machine tool 100, provided with a rotary workhead device 10 according the embodiment of the invention, is a horizontal machine tool comprising a bed 102 adapted to be secured to a factory floor, a column 104 mounted to the top face of a rear part of the bed 102 for moving in the left-right direction (X-axis direction) by an X-axis feed mechanism, a spindle head 106 mounted to the front surface of the column 104 for moving in the vertical direction (Y-axis direction) by a Y-axis feed mechanism and a saddle 110 mounted to the top face of a front part of the bed 102 for moving in the front-rear direction (Z-axis direction) by a Z-axis feed mechanism. A spindle 108 is supported by the spindled head 106 for rotation about a rotational axis extending in the front-rear direction. A tool T is attached to the end of the spindle 108. A rotary table 112 is rotatably supported by the saddle 110 for angular range of ±180 degrees about a vertical axis (B-axis).

The X-axis feed mechanism may include a pair of X-axis guide rails 102a horizontally extending in the left-right direction in the top face of the bed 102, guide blocks (not shown) mounted to a bottom face of the column 104 for sliding along the X-axis guide rails, an X-axis ball screw (not shown) extending in the X-axis direction in the bed 102, a nut (not shown) mounted to the lower end portion of the column 104 so as to engage the X-axis ball screw and a servomotor, connected to an end of the X-axis ball screw, for driving the X-axis ball screw.

Similarly, the Y-axis feed mechanism may include a pair of Y-axis guide rails (not shown) vertically extending in the column 104, guide blocks (not shown) mounted to the spindle head 106 for sliding along the Y-axis guide rails, a Y-axis ball screw (not shown) extending in the Y-axis direction in the column 104 a nut (not shown) mounted in the spindle head 106 so as to engage the Y-axis ball screw and a servomotor, connected to an end of the Y-axis ball screw, for driving the Y-axis ball screw.

Similarly, the Z-axis feed mechanism may include a pair of Z-axis guide rails 102b horizontally extending in the top face of the bed 102 perpendicularly to the X-axis guide rails 102a, guide blocks (not shown) mounted to a bottom face of the saddle 110 for sliding along the Z-axis guide rails, an Z-axis ball screw (not shown) extending in the Z-axis direction in the bed 102, a nut (not shown) mounted to a bottom face of the saddle 110 so as to engage the Z-axis ball screw and a servomotor, connected to an end of the Z-axis ball screw, for driving the Z-axis ball screw.

The machine tool 100 further comprises a pallet changer 120 mounted to the front end of the bed 102 and a pallet stocker 114 disposed in front of the pallet changer 120. In this embodiment, the machine tool 100, including the pallet changer 120 and the pallet stocker 114, is enclosed by a splash guard 116. The pallet changer 120 comprises a changing arm 124 which can rotate about and vertically move along a vertical axis O, and a revolving door 122 which can rotate about and vertically move along the axis O together with the changing arm 124. The revolving door 122 divides the space within the splash guard 116 into a machining chamber 126 between the revolving door 122 and the column 104 and a preparation chamber 128, where the pallet stocker 114 is disposed, in front of the revolving door 122. A front door 116a, provided in a front panel of the splash guard 116, allows an operator to access the preparation chamber 128.

In this embodiment, a workpiece W is mounted to the rotary workhead device 10 and processed with the tool T. The rotary workhead device 10 comprises a base plate 12 forming a pallet, stationary and movable rotary workheads 14 and 16 mounted to the top face of the base place 12 at either end thereof. Direct drive servomotors (not shown) are respectively provided in the stationary and movable rotary workheads 14 and 16 for rotation about a horizontal rotational axis (A-axis). Face plates 14a and 16a are secure to the respective shafts of the servomotors. The face plates 14a and 16a are provided with fixtures 14b and 16b for fixing a workpiece W. The stationary rotary workhead 14 is secure to the top face of the base plate 12 at one end thereof with a spacer 18 having a suitable thickness allowing the axes of the servomotors of the stationary and movable rotary workheads 14 and 16 to coincide with each other whereby a horizontal rotational feed axis, i.e., A-axis is formed. The movable rotary work head 16 is mounted to the top face of the base plate 12 at the opposite end for linear motion by guide rails, which extend parallel to the common rotational axis (A-axis) of the stationary and movable rotary workheads 14 and 16 and the servomotors, and slider 22 mounted to a bottom face of the movable workhead 16 for sliding along the guide rails 20.

Accordingly, the machine tool 100 is a machine tool having five feed axes of three orthogonal linear feed axes, i.e., X-axis, Y-axis and Z-axis, and two rotational feed axes, i.e., A-axis and B-axis.

The rotary workhead device 10 further comprises, in order to displace the movable rotary workhead 16 along the guide rails 20, lever 32, cam 34 attached to the end of the lever 32 and a cam follower 38 mounted to the slider 22 so as to engage the cam 34. The lever 32 is mounted the base plate 12 for rotation about a vertical axis 32a. In the embodiment of FIG. 3, by rotating the lever 32 in the counter clockwise direction, the movable rotary workhead 16 moves (to the right in FIG. 3) away from the stationary rotary workhead 14.

The rotary workhead device 10 further comprises a hydraulic cylinder 42 for biasing the movable rotary workhead 16 in the direction away from the stationary workhead 14 and a pressure plate 43 attached to the slider so that a piston 42a of the hydraulic cylinder 42 can abut thereagainst, a hydraulic pressure source 44 for supplying hydraulic pressure to the hydraulic cylinder 42 and an on-off valve 46 for controlling the on and off of the hydraulic pressure supply to the hydraulic cylinder 42. The hydraulic pressure source 44 may include for example a reservoir (not shown) for accumulating the working oil, a pump for supplying the working oil to the hydraulic cylinder 42. The hydraulic cylinder 42 is preferably a one-way cylinder which works effectively in the extending direction of the piston 42a

The rotary workhead device 10 is further provided with a seating sensor 50. The seating sensor 50 may comprise for example a sensor block 52 attached to the base plate 12, a pneumatic port 54 formed in the sensor block 52 so as to face the end of the slider 22 and a pressure sensor (not shown), fluidly communicating with the pneumatic port 54, for detecting the pressure in the pneumatic port 54. When the end of the slider 22 contacts the sensor block 52, the port 54 is closed by the end of the slider 22 whereby the pressure sensor detects the increase in the pressure in the pneumatic port 54. When a workpiece is mounted between the fixers 14b and 16b, the end of the slider 22 does not contact the sensor block 52. However, if the pressure sensor detects an increase in the pressure in the pneumatic port 54, it means that the end of the slider contacts the sensor block 52. This may be judged that the tension applied to the workpiece W and may trigger a warning.

In order to supply electric power to the servomotors of the stationary and movable rotary workheads respectively, and to supply the working oil to the hydraulic cylinder 42, the machine tool 100 comprises a cable and conduit assembly 36 and a central relay 118 for connecting the cable and conduit assembly 36 to an electric source (not shown) and the hydraulic pressure source 44. The cable and conduit assembly 26 is connected to the servomotors and the hydraulic cylinder 42 through the relay 24 provided on the movable rotary workhead 16.

The functional operation of this embodiment will be described below.

When a machining operation in the machining chamber 126 is completed, a machine controller (not shown) of the machine tool sends a pallet changing command to the pallet changer 120. This moves the changing arm 124 upwardly along with the revolving door 122 along the axis O whereby either end of the changing arm 124 engage the rotary workhead device 10, to which the processed workpiece W is mounted in the machining chamber 126, and the rotary workhead device 10', to which a non-processed workpiece is mounted in the preparation chamber 128, so as to simultaneously lift them from the rotary table 112 and the pallet stocker 114, respectively. Further, the pallet changer 120 rotates the changing arm 124 over 180 degrees about the vertical axis O together with revolving door 122, whereby the processed workpiece W and the non-processed workpiece, respectively attached to the rotary workhead devices 10 and 10', are replaced with each other. After the rotation of the changing arm 124 over 180 degrees, the pallet changer 120 lowers the changing arm 124 with the revolving door 122, whereby the rotary workhead device 10', to which the non-processed workpiece is mounted, and the rotary workhead device 10, to which the processed workpiece W is mounted, are respectively placed onto the rotary table 112 and the pallet stocker 114.

When a workpiece W is processed in the machining chamber 126 of the machine tool 100, an operator of the machine tool 100 can open the front door to access the preparation chamber 128 in order to remove a processed workpiece from and to mount a new and non-processed workpiece to the rotary workhead device 10. For this purpose, the operator closes the on-off valve 46 to block the hydraulic pressure applied to the hydraulic cylinder 42 from the hydraulic pressure source 44. Then, the workpiece W is removed from the rotary workhead device 10 by loosening the fixtures 14b and 16b, e.g., chucks.

Thereafter, a new and non-processed workpiece is mounted to the fixtures 14b and 16b. At that time, the lever 32 can be rotated in clockwise or counter-clockwise direction to move the movable rotary workhead 16 along the guide rails 20 so as to adjust the distance between the movable and stationary rotary workheads 16 and 14 to the length of the non-processed workpiece. An operator can directly hold and move the movable rotary workhead device, even if the lever 32 is not provided. However, the provision of the lever 32 allows fine adjustment of the positioning of the movable rotary workhead device 16, and facilitates the mounting operation of a workpiece W. After a non-processed workpiece is secured to the fixers 14b and 16b, the on-off valve 46 is opened so as to apply the hydraulic pressure to the hydraulic cylinder 42 from the hydraulic pressure source 44, whereby the piston 42a of the hydraulic cylinder 42 abuts the pressure plate 43 so that the movable rotary workhead 16 is biased in the direction away from the stationary rotary workhead 14, resulting in application of tension in the workpiece.

Figure 5:
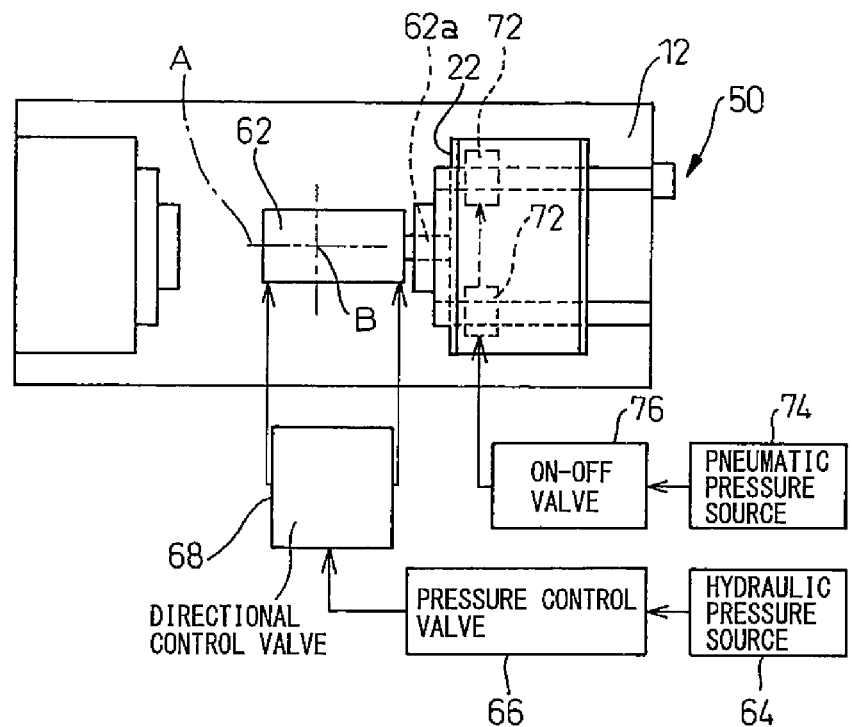
FIG. 5 is a plan view similar to FIG. 3 a rotary workhead device according to a second embodiment.

Now, with reference to FIG. 5, a second embodiment of the invention will be described below. FIG. 5 is a plan view, similar to FIG. 3, of a rotary workhead device according to the second embodiment.

The rotary workhead device 50 according to the second embodiment can be mounted, similar to the rotary workhead device 10 according to the first embodiment, to the machine tool 100, and has generally the same configuration. Accordingly, only the configurations different from the rotary workhead device 10 according to the first embodiment will be described below to avoid redundant explanations.

A hydraulic cylinder 62 is mounted to a base plate 12 of the rotary workhead device 50, and is oriented so that a piston 62a extends and retracts in the direction of an axis A. The piston 62a is secured to a slider 22 of a movable rotary workhead 16. The movable rotary workhead 16 can reciprocally move in the direction of axis A along with the piston 62a. The hydraulic cylinder 62 is fluidly connected to a hydraulic pressure source 64 through a pressure control valve 66 and a directional control valve 68. The directional control valve 68 may be a three-position directional control valve having a first position for extending the piston 62a, a second position for retracting the piston 62a and a third neutral position, at which the movable rotary workhead 16 can be manually moved along guide rails 20. Although this embodiment is not provided with a lever device similar to the lever 32 of FIG. 3, a lever may be provided. The pressure control valve 66 is an element for adjusting the hydraulic pressure from the hydraulic pressure source 64 to the hydraulic cylinder 62 according to requirements of machining processes, and may be switched between a plurality of positions for different tensile or compressive forces, for example 0 kg, 35 kg, 70 kg and 100 kg applied to the a workpiece to be processed, or may continuously adjust the tensile or compressive force.

Further, air brakes 72 are provided in a bottom face of the movable rotary workhead 16. A pneumatic pressure source 74 is fluidly connected to the air brakes 72 through an on-off valve 76. The air brakes 72 insert wedge shaped members between the slider 22 and the guide rails 20 by the pneumatic pressure from the pneumatic pressure source 74 so as to clamp the slider relative to the guide rails 20.

Figure 6:
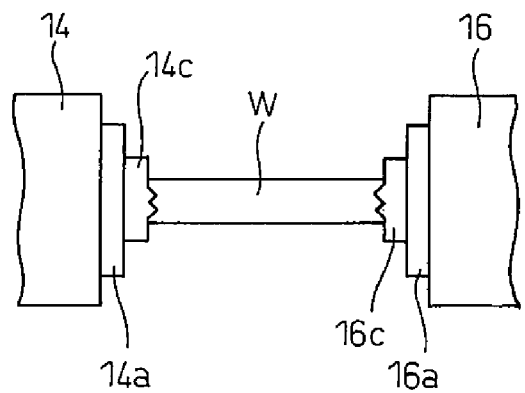
FIG. 6 is an illustration of an alternative embodiment of the fixtures.

Further, when a workpiece is applied a compressive force, the fixers 14b and 16b may be replaced with centering couplings 14c and 16c, as shown in FIG. 6, having features complementary to the end shapes of the workpiece W.

The functional operation of the second embodiment will be described below.

Similar to the first embodiment, when a workpiece W is processed in the machining chamber 126 of the machine tool 100, an operator of the machine tool 100 can open the front door to access the preparation chamber 128 in order to remove a processed workpiece from and to mount a new and non-processed workpiece to the rotary workhead device. For this purpose, the operator closes the on-off valve 76 to block the pneumatic pressure applied to the air brakes 72 from the pneumatic pressure source 74 so that the air brakes are unclamped. This allows the rotary workhead 16 to be manually moved along the guide rails 20. Then, the workpiece W is removed from the rotary workhead device by loosening the fixtures 14b and 16b, e.g., chucks.

Thereafter, a new and non-processed workpiece is mounted to the fixtures 14b and 16b. At that time, an operator can manually move the movable rotary workhead 16 along the guide rails 20 so as to adjust the distance between the movable and stationary rotary workheads 16 and 14 to the length of the non-processed workpiece. After a non-processed workpiece is secured to the fixers 14b and 16b, the directional control valve 68 is moved to one of the first and second positions so as to apply tensile or compressive force to the non-processed workpiece. Then, the on-off valve 76 is opened in order to clamp the slider to the guide rails 20 by the air brake 72. This allows the non-processed workpiece to be applied with tensile or compressive force even if the directional control valve 68 is moved to the neutral position and the hydraulic pressure to the hydraulic cylinder 62 is blocked. Accordingly, the air brake 72 allows the supply of the hydraulic pressure to the hydraulic cylinder 62 to be blocked, and thus contributes to energy saving.

According the above-described first and second embodiments, a workpiece can be processed by controlling the three orthogonal liner feed axes, i.e., X-axis, Y-axis and Z-axis, and the two rotational feed axes, i.e., A-axis and B-axis with tensile or compressive force applied to the workpiece so as to increase apparently the rigidity of the workpiece. Therefore, even a thin and low rigidity workpiece, such as a turbine blade, can be successfully processed because the bending is very small and vibrations are not generated.

Further, according to the above-described first and second embodiments, it is not necessary to form a hydraulic cylinder in a tailstock, as described in patent document 1, because the hydraulic cylinder 42, providing means for biasing the movable rotary workhead 16 in the direction away from the stationary rotary workhead 14, or the hydraulic cylinder 62, providing means for biasing the movable rotary workhead 16 in the direction away from or toward the stationary rotary workhead 14, can be disposed outside of the movable rotary workhead 16. This avoids the necessity of a hydraulic cylinder formed in a narrow space of the movable rotary workhead 16 whereby the configuration is simplified and the cost is reduced.

Further, rotary workheads available in the market can be used as the stationary and movable rotary workheads 14 and 16, which remarkably reduces the production cost. If commercial products are used for the stationary and movable rotary workheads 14 and 16, it is advantageous for users, because a special operation is not required. Further, when a problem occurs, it can be quickly fixed by replacing the broken rotary workhead with a commercial product, and therefore the downtime of the machine tool 100 is reduced.

Furthermore, according to the first and second embodiment, during the process of the workpiece W, a workpiece for the next process can be prepared, and therefore, the total processing time can be reduced compared with the invention of patent document 2.

Furthermore, by using the centering couplings 14c and 16c as the fixtures, when a workpiece is remounted to the rotary workhead device 50 after the workpiece has been once removed, the workpiece can be placed precisely in the previous position before the removal.

The invention claimed is:
1. A machining center comprising:
a bed;
a spindle head configured to support a spindle, having an end to which a tool is attached, for rotation about a rotating axis extending in a front-rear direction;
guide rails placed on a top surface of the bed and extending in the front-rear direction;
a saddle mounted on the bed so that the saddle moves along the guide rails in the front-rear direction;
a table rotatably supported by the saddle;
a rotary workhead device, disposed on a pallet removably secured to the table of the machining center, for rotatably mounting a workpiece to be processed; and
a pallet changer changing the pallet removably secured to the table of the machining center for another pallet, wherein
the rotary workhead device comprising:
two opposing rotary workheads disposed on the pallet so as to align respective rotational axes with each other;
a guide for allowing at least one of the rotary workheads to move in a direction of the rotational axes, the guide being mounted on a top face of the pallet so as to receive a bottom face of the one of the rotary workheads; and
an actuator, disposed completely outside the rotary workheads, for biasing the one of the rotary workheads in the direction away from the other of the rotary workheads, the actuator comprising a fluid pressure operated cylinder for applying a biasing force to the one of the rotary workheads, and a pressure control device for varying a fluid pressure supplied to the fluid pressure operated cylinder,
wherein a tensile force is applied to the workpiece secured at its ends between the two rotary workheads,
the fluid pressure operated cylinder is disposed between one of the rotary heads and the pallet, and
the tensile force applied to the workpiece is adjusted to a plurality of predetermined values by changing the fluid pressure supplied to the fluid pressure operated cylinder, and
the pallet changer comprising:
a first arm carrying the pallet thereon; and
a second arm carrying the another pallet thereon,
wherein the pallet changer moves upwards, rotates and moves downward the first and second arms, so that the another pallet is removably secured to the table of the machining center in place of the pallet that has been removably secured to the table of the machining center,
wherein the machining center further comprising;
a cable and conduit assembly, connected at an end thereof to the rotary workhead, for supplying electric power to a servomotor of the rotary workhead and supplying a working oil to the fluid pressure operated cylinder, and
a central relay, connected to the other end of the cable and conduit assembly, for connecting the cable and conduit assembly to an electric source and a hydraulic pressure source.

2. The machining center according to claim 1, wherein the guide comprises a lever device for allowing manual operation of movement of the one of the rotary workheads when a biasing force of the actuator is not applied.

3. The machining center according to claim 1, wherein the guide comprises a brake device for clamping movement of the one of the rotary workheads.

* * * * *